United States Patent [19]
Fukaya et al.

[11] Patent Number: 5,481,240
[45] Date of Patent: Jan. 2, 1996

[54] THERMISTOR-TYPE TEMPERATURE SENSOR

[75] Inventors: Matuo Fukaya, Obu; Junichi Nagai, Gifu; Kaoru Kuzuoka, Toyota, all of Japan

[73] Assignee: Nippondenso Co., Ltd., Kariya, Japan

[21] Appl. No.: 187,512

[22] Filed: Jan. 28, 1994

[30] Foreign Application Priority Data

Feb. 2, 1993 [JP] Japan .................................. 5-037465

[51] Int. Cl.⁶ .................................................. H01C 7/10
[52] U.S. Cl. ...................................... 338/22 R; 338/28
[58] Field of Search .......................... 338/22 R, 225 D, 338/25, 28

[56] References Cited

U.S. PATENT DOCUMENTS 3,754,201  8/1973  Adams ........................................ 338/28

FOREIGN PATENT DOCUMENTS 62-278421  12/1987  Japan .

*Primary Examiner*—Marvin M. Lateef
*Attorney, Agent, or Firm*—Cushman, Darby & Cushman

[57] ABSTRACT

A low-cost and compact thermistor-type temperature sensor which has a thermo unit and a metal tube solidly fixed by cement. The sensor has an enlarged reserve space between the thermo unit and the metal tube to accommodate an excess amount of the cement therein, so that intrusion of the cement into electrical connection portions of lead wires is prevented. This enlarged space assures good electrical insulation between the electrical connection portions and stable measurement characteristics.

9 Claims, 2 Drawing Sheets

THERMISTOR-TYPE TEMPERATURE SENSOR

BACKGROUND OF THE INVENTION

1. Field of the Invention

The present invention relates to a thermistor-type temperature sensor for measuring exhaust gas temperature of an internal combustion engine or the like.

2. Description of the Related Art

Among the wide variety of temperature sensors presently available, a typical one is a thermistor-type sensor in which temperature-resistance characteristics of a thermistor element are used.

To measure temperature by the thermistor-type sensor, the thermistor element on the tip of an insulation tube is put close to the subject to be measured. The thermistor element and the insulation tube are encapsulated in a metal tube to shield and protect the element.

Japanese unexamined patent publication No. 62-278421 teaches one structure in which heat-resistant cement fixes the thermistor element within the insulation tube within the metal tube is used. For example, as shown in FIG. 4 illustrating a sensor 9, a thermo unit 90 which has a thermistor element 91 stuck out from the end of insulation tubes 921 and 922 is fixed to a metal tube 93 by heat-resistant cement 94. Before the thermo unit 90 is inserted into the metal tube 93, electrical lead wires 95 of the thermistor element 94 are connected with output signal lead wires 96 at connection portion 951. A threaded metal fixture 97 is fixed to the metal tube 93 so that the sensor 9 may be screw-threaded into an exhaust pipe.

However, the above structure has the following drawbacks. In the production process, particularly in the process of filling the cement 94 into the closed bottom of the metal tube 93, fine volume control of the cement becomes very important because it determines depth or axial length of the cement 94 filled in the metal tube 93. It also determines the quality of the sensor as explained hereunder.

That is, if the volume of the cement 94 filled into the metal tube 93 is less than a specified appropriated volume, it makes the filled length shorter than that specified and results in, for example, the disconnection of the output signal lead wires 96 and the electrical lead wires 95 by the lack of anti-vibration strength due to the insufficient holding strength of the thermo unit 90.

On the other hand, if the volume of the cement 94 is much more than that specified, it makes the length longer than specified and the cement 94 covers the connection portion 951. This results in the deterioration of electrical insulation between the output signal lead wires 96 and the electrical lead wires 95, an increase of electrical leakage current therebetween, and an increase in the measuring error of the temperature due to the growth of an electric parallel circuit. The connection portion 951 is practically covered by insulation material such as a teflon tube. However, the cement 94 may intrude into the teflon tube and water which will be contained in the cement 94 even after drying causes a reduction in the electrical insulation resistance to a value less than several kilo-ohms.

The gap G between the inner diameter of the metal tube 93 and the outer diameter of the thermo unit 90 is specified as small as possible to hold the thermo unit 90 and the metal tube 93 coaxially parallel. As a conventional solution, it can be thought to sufficiently extend the axial length of the metal tube 93 and the thermo unit 90 to make a space for a cement filling. However, this sensor structure does not meet the practical requirement for compactness.

SUMMARY OF THE INVENTION

It is an object of the present invention to provide an improved practical thermistor-type temperature sensor which has a sufficient and appropriate reserve space to prevent the intrusion of cement into connection portions of electrical lead wires and to eliminate above-mentioned drawbacks.

The reserve space can be formed by, for instance, (1) an enlargement of the inner diameter of the metal tube at a portion corresponding to the electrical connections, (2) a reduction of the outer diameter of an insulation tube at a portion corresponding to the electrical connections, and (3) a combination of (1) and (2).

DETAILED DESCRIPTION OF THE PREFERRED EMBODIMENTS

Figure 1:
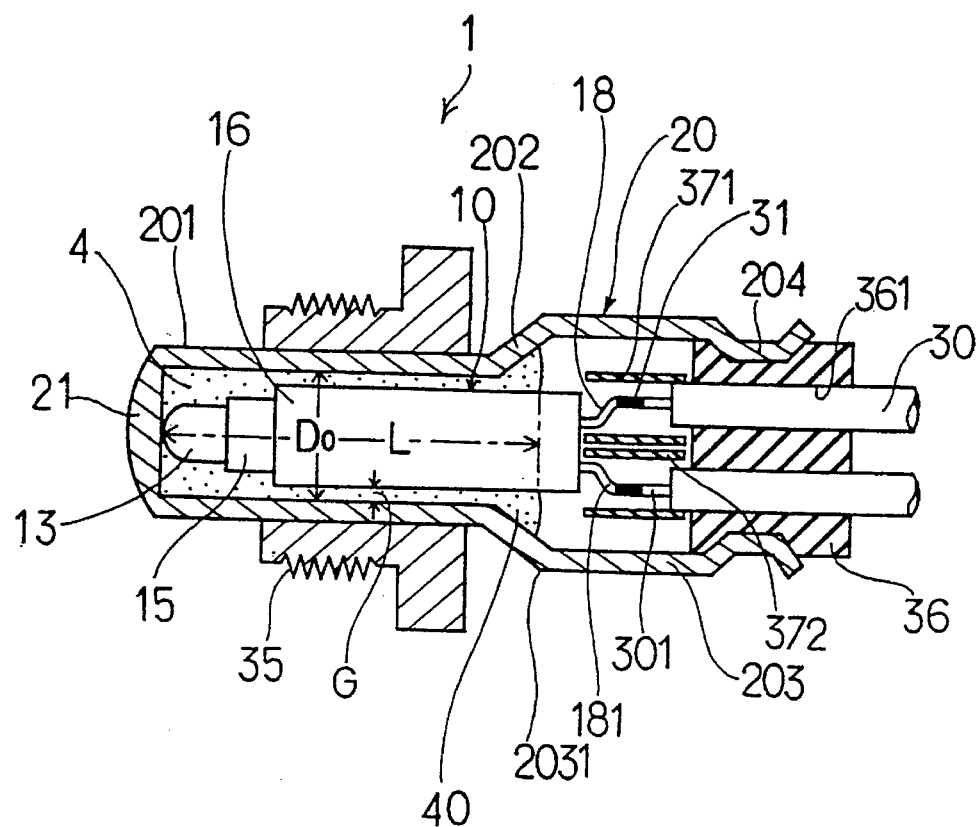
FIG. 1 is a sectional view of a temperature sensor according to a first embodiment of the present invention.

FIG. 1 shows a first embodiment of a thermistor-type temperature sensor 1 according to the present invention.

The thermistor-type temperature sensor 1 of the first embodiment has a metal tube 20 with closed tip portion 21, thermo unit 10 inserted into the front or closed tip portion of the metal tube 20, and lead wires 30 connected to the thermo unit 10. The thermo unit 10 comprises insulation tubes 15 and 16 of different diameters, thermistor element 13 stuck out from the end of the insulation tube 15, and lead wires 18 connected to the thermistor element 13. The thermo unit 10 is inserted into the metal tube 20 with its front side fixed with the closed tip of the metal tube 20 by a cement 4. A reserve space 40 is provided by a radially enlarged portion of the metal tube 20, between the rear side of the thermo unit 10 and the front side of connection portions 31 between the lead wires 18 and the lead wires 30.

The thermistor-type temperature sensor of the first embodiment has a threaded metal fixture 35 to be screw-threaded into a measurement point, for instance, an exhaust gas pipe of an automobile engine, and has a rubber plug 36 with through holes 361 at the open or rear end of the metal tube 20 to hold the lead wires 30. The rubber plug 36 is crimped securely by the constricted portion 204 of the metal tube 20.

The insulation tubes 15 and 16 of the thermo unit 10 are two pieces, so as to be inserted easily into the metal tube 20. The thermistor element 13 is stuck out to be exposed from the tip of the insulation tube 15. The thermo unit 10 are completed by assembling the thermistor element 13, insulation tubes 15 and 16 and lead wires 18 by adhesive materials.

The thermo unit 10 thus assembled is inserted into the metal tube 20 in which the cement 4 is previously filled therein to the front and inside bottom of the metal tube 20 and dried after the insertion of the thermo unit 10. The cement 4 for solidly fixed the thermo unit 10 in position within the metal tube 20 and is an adhesive material made from, for instance, magnesia-zirconium with binder and solvent.

The metal tube 20, in practical design, has dimensions of 4.7 mm in inner diameter at a front portion 201 and 6.1 mm in inner diameter at an enlarged rear portion 203. A conical interconnecting portion 202 connects the front and rear portions. The length of the thermo unit 10 is approximately 30 mm.

A front end 2031 of the enlarged portion 203 of the metal tube 20 is positioned at the front side from the connection portion 31 of the lead wires 18 by 5 mm. The lead wire tips 181 out of the thermo unit 10 and the lead wire tips 301 out of the lead wires 30 are mechanically and electrically connected at the connection portion 31. Shield plates 371 and 372 are provided to electrically insulate the lead wires 18 and 30 and connecting portions 31 from metal parts.

Gap width G between the inner surface of the metal tube 20 and outer surface of rear side insulation tube 16 is determined by the viscosity of the applied cement 4. In the case of the viscosity of the cement being around 10 Pa.s, an appropriate length of the gap G is from 0.2 to 0.5 mm. If the gap length G is smaller than appropriate requirement which depends on the viscosity of the cement 4, it becomes difficult to insert the thermo unit 10 into the metal tube 20. On the other hand, if the gap G is larger than the appropriate value, it becomes difficult to insert the thermo unit 10 while maintaining a good parallel relation with the metal tube 20.

In case of 10 Pa.s cement viscosity, necessary minimum length covered by the cement 4 between the insulation tube 15 and 16 and metal tube 20 is 10 mm along the axial length L so on to maintain the necessary adhesive strength. To make the sufficient and effective reserve space 40 for the cement, the gap G between the inner diameter of the enlarged portion 203 of the metal tube 20 and the outer diameter of the insulation tube 16 is from 0.9 to 1.2 mm. In other words, the following relationship which means that the difference in gap widths (G1-G) is equal to or larger than one-tenth of a diameter D0 is recommended;

$$G1 \geq 0.1 \times D0 + G$$

G1: Gap width between the inner diameter of the enlarged portion 203 of the metal tube 20 and the outer diameter of the insulation tube 16,
D0: Inner diameter of the metal tube 20 near its closed end portion.

By the invention explained in detail hereabove, it becomes possible to prevent the intrusion of the cement 4 into the electrical connection portions 31 and to eliminate drawbacks found in conventional devices as follows.

(1) By the existence of reserve space 40, the intrusion of the cement 4 which will keep water component therein even after drying is prevented without fine volume control, and satisfactory electrical insulation characteristics (more than 1M ohms) can be maintained for a stable temperature measurement.

(2) By the development and improvement of the new fixing structure of the thermo unit 10 to the metal tube 20 using heat-resistive cement, a simple, small, low-cost and high durability thermistor-type temperature sensor can be realized.

Figure 2:
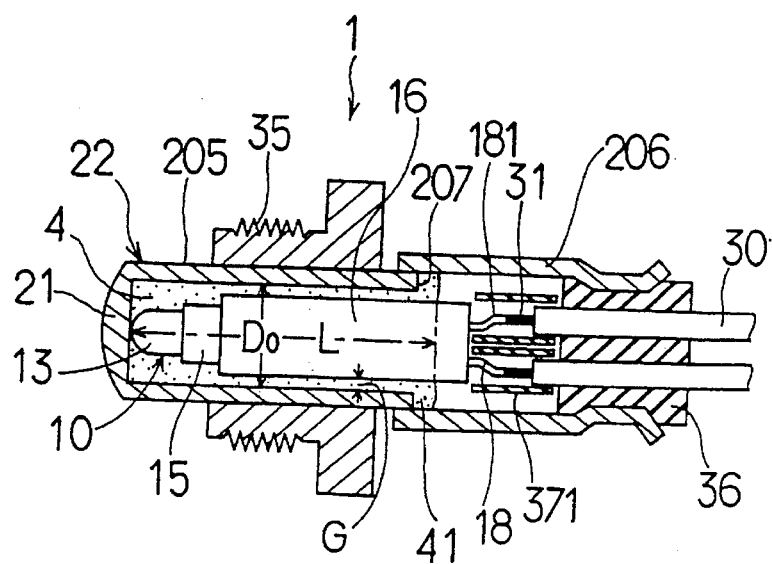
FIG. 2 is a sectional view of a second embodiment of the present invention.

FIG. 2 shows a second embodiment of the thermistor-type temperature sensor according to the present invention in which the same reference numerals designate the same or like parts as in the first embodiment.

In the second embodiment, a metal tube 22 has two pieces, that is, a front side tube 205 and a rear side tube 206 which has a larger inner diameter than that of the front side tube 205. The gap G between the tube 205 and the front side insulation tube 16 is made smaller than that between the metal tube 206 and the insulation tube 16 so on to realize a sufficient reserve space 41 for the cement 4. A junction portion 207 of the metal tubes 205 and 206 is positioned at the front side of electrical connection portion 31 by 8 mm.

In the second embodiment, the following relationship is recommended, too.

$$G1 \geq 0.1 \times D0 + G$$

Otherwise the structure and design concept of the second embodiment are the same as in the first embodiment.

Figure 3:
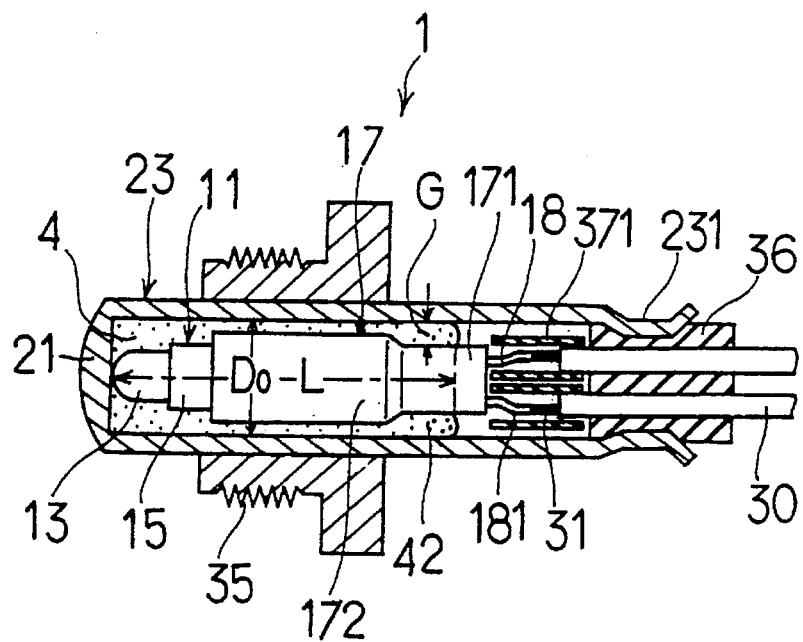
FIG. 3 is a sectional view of a third embodiment of the present invention.
Figure 4:
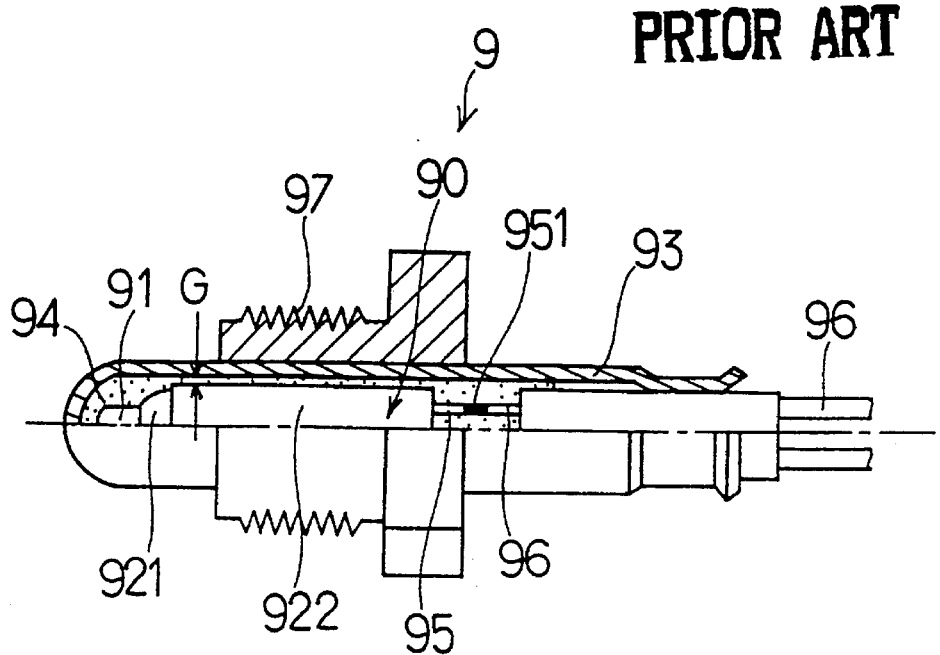
FIG. 4 is sectional view of a conventional temperature sensor.

FIG. 3 shows a third embodiment of the thermistor-type temperature sensor according to the present invention in which the same reference numerals designate the same or like parts as in the first embodiment.

In the third embodiment, a rear end 171 of a rear side insulation tube 17 of a thermo unit 11, is reduced in its outer diameter without is similar modification to the metal tube 23, except for a small modification of the constricted portion 231.

This structure provides a larger gap between the rear end 171 of the insulation tube 17 and the metal tube 23 so as to assure a required size reserve space 42 for the cement 4. The axial length of the rear end portion 171 is more than 5 mm and the following relationship is recommended as in the first and second embodiments.

$$G1 \geq 0.1 \times D0 + G$$

The present invention having been described hereabove should not be limited to the disclosed embodiments but may be modified in various ways without departing from the spirit of the present invention.

What is claimed is:

1. A thermistor-type temperature sensor comprising:
   a metal tube having an open rear end and a closed front end;
   a thermo unit including a thermistor element and exposed electrical lead wires, said thermo unit being positioned axially within said metal tube;
   a cement filling a longitudinal space between said metal tube and said thermo unit, said cement fixing said thermo unit in position within said metal tube, and said cement coveting an outer surface of said thermo unit between said thermistor element to a vicinity of said exposed electrical lead wires; and
   reserve space means formed between said metal tube and said thermo unit at a portion between said thermistor element and said exposed electrical lead wires, for providing an enlarged space to accomodate overfilled cement, said enlarged space being continuous with said longitudinal space between said metal tube and said thermo unit.

2. A thermistor-type temperature sensor according to claim 1, wherein said reserve space means includes an enlarged portion of said metal tube enlarged at a rear end portion of said thermo unit so that a first gap formed between said enlarged portion of said metal tube and said thermo unit is larger than a second gap formed between a non-enlarged portion of said metal tube and said thermo unit.

3. A thermistor-type temperature sensor according to claim 1, wherein said reserve space means includes a constricted portion of said thermo unit constricted at a rear end thereof so that a first gap formed between said constricted portion of said thermo unit and said metal tube is larger than a second gap formed between a non-constricted portion of said thermo unit and said metal tube.

4. A thermistor-type temperature sensor comprising:
a metal tube having an open rear end and a closed front end;
a thermo unit including a thermistor element and exposed electrical lead wires, said thermo unit being positioned axially within said metal tube;
a cement filling a space between said metal tube and said thermo unit, said cement fixing said thermo unit in position within said metal tube; and
reserve space means formed between said metal tube and said thermo unit at a portion between said thermistor element and said exposed electrical lead wires, for providing an enlarged space to accomodate overfilled cement;
wherein a difference in a first gap formed between said metal tube and said thermo unit at said reserve space means and a second gap formed between said metal tube and said thermo unit at other than said reserve space means is at least one-tenth of an inner diameter of said metal tube at other than said reserve space means.

5. A temperature sensor comprising:
a longitudinal tube having a first portion of a first predetermined diameter and a second portion of a second predetermined diameter larger than said first predetermined diameter, said second portion being continuous with said first portion;
a sensing unit having electrical lead wires exposed therefrom and inserted in said tube longitudinally, said electrical lead wires being positioned within said second portion of said longitudinal tube; and
a cement filling a space formed between said longitudinal tube and said sensing unit, said cement fixing said sensing unit in position within said longitudinal tube, said cement filling wholly a first space formed by said first portion of said longitudinal tube and filling only partly a second space formed by said second portion of said longitudinal tube so that said electrical lead wires are not covered thereby.

6. A temperature sensor according to claim 5, wherein:
said second portion of said longitudinal tube has an intermediate portion which diameter gradually increases from said first predetermined diameter, said cement filling said intermediate portion continuously from said first portion of said longitudinal tube; and
said electrical lead wires are positioned at a portion where said cement is not filled.

7. A temperature sensor comprising:
a longitudinal tube having a predetermined diameter;
a sensing unit comprising:
a first portion of a first predetermined diameter,
a second portion of a second predetermined diameter smaller than said first predetermined diameter, and
electrical lead wires extending from said second portion;
a cement filling a longitudinal space formed between said longitudinal tube and said sensing unit, said cement fixing said sensing unit in position within said longitudinal tube, said cement covering wholly said first portion of said sensing unit and covering only partly said second portion of said sensing unit so that said electrical lead wires are not covered by said cement.

8. A temperature sensor comprising:
a tube having a closed end and an open portion;
a thermo unit comprising:
a temperature sensing portion at said closed end of said tube, and
electrical lead wires at said open portion of said tube, said thermo unit being for transmitting electrical signals from a sensing portion of said thermo unit;
electrical output lead wires inserted into said tube and electrically connected to said electrical lead wires of said thermo unit;
a filler material filling a longitudinal space formed between a first longitudinal portion of said tube and said thermo unit, said filler material holding said thermo unit in position within said tube;
connection portions between said electrical lead wires of said thermo unit and said electrical output lead wires in said tube;
a second portion of said tube forming an enlarged space which is continuous with said first portion of said tube forming said longitudinal space, said enlarged space having a first diameter larger than a second diameter of said longitudinal space;
said second portion of said tube forming said enlarged space being close to said connection portions in said tube; and
said filler material filling said enlarged space between said closed end of said tube and a border between said enlarged space and said longitudinal space.

9. A temperature sensor according to claim 8, wherein said filler material fills said longitudinal space completely and fills said enlarged space only partly so that said connection portions are exposed in said tube.

* * * * *